3,033,228
LOW-FORCE VALVE CONTROL
William Forest Mohler, Gardena, Calif., assignor to Lewis K. Rimer, Arcadia, Calif.
Filed Mar. 23, 1959, Ser. No. 801,032
3 Claims. (Cl. 137—490)

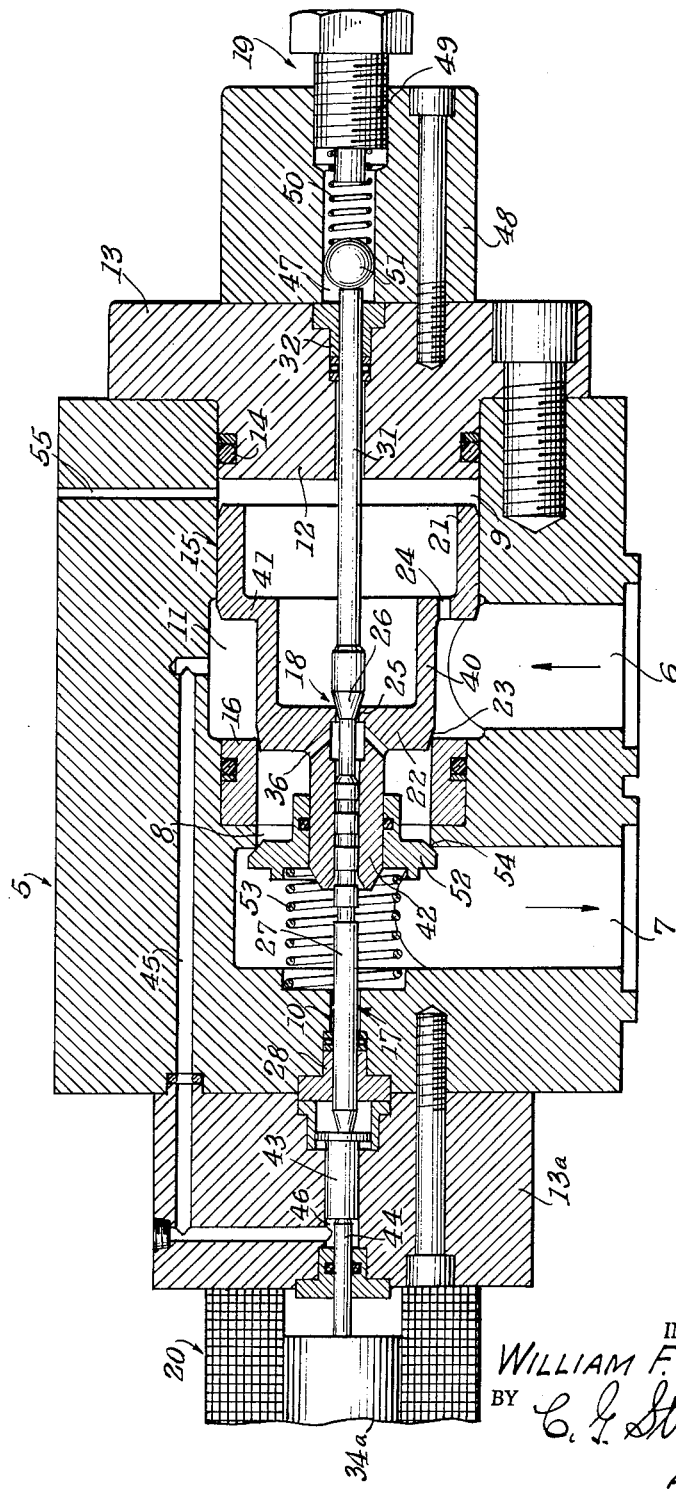

This invention relates to a high-pressure valve that is operable by a low force considerably smaller than the pressures handled by the valve.

An object of the present invention is to provide a flow valve for high-pressure fluids that embodies a valve stem that is so balanced as to be easily shifted to open the valve with a small application of force, either mechanically or electrically applied.

Another object of the invention is to provide a valve of the character referred to in which a flow-controlling poppet is held closed by the valve pressure and which opens to institute flow upon a low-force shift of a control stem that bleeds the pressure from within the poppet.

A further object of the invention is to provide a valve in which the poppet is balanced after the valve is opened relieving the same of inlet pressure and enabling rapid closing to shut off flow.

A still further object of the invention is to provide a valve of the type above referred to that opens itself to flow and relief of pressure in the event of an unduly great pressure load on the inlet of the valve.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes a preferred embodiment of the present invention, which is given by way of illustration or example only.

In the drawing, like reference characters designate similar parts in the several views.

The FIGURE is a longitudinal sectional view of a preferred form of the invention.

The present valve comprises a body 5 in which is provided an inlet 6, a preferably parallel outlet 7, and a bore or passage 8 connecting said inlet and outlet. The latter, at one end, is counterbored to form a cylinder 9 and, at the other end, a reduced bore 10 is provided. Between bore 8 and cylinder 9, there is provided an enlarged chamber 11, the same being in direct communication with the inlet 6.

The cylinder 9 is shown as being closed by a boss 12 on the end of a plate 13. A seal 14 is provided to seal against flow from said cylinder past said plate 13. Thus, plate 13 becomes a fixed part of the body 5.

The valve that is illustrated comprises, generally, a hollow poppet 15 in said cylinder 9, a flow-controlling valve seat 16 in the bore 8 and cooperating with the poppet, a stem 17 extending longitudinally through the poppet, a pilot valve 18 closing flow from the interior of the poppet to the outlet 7, means 19 biasing the poppet in flow-arresting engagement with seat 16, and means 20, carried by an extension 13A of the body 5, to move the stem 17 against the biasing force of the means 19 to open the valve to flow between the inlet 6 and the outlet 7.

In the form of the invention that is illustrated, the poppet 15 is shown as a hollow piston having a tubular wall 21 that slidingly fits the cylinder 9 and is smaller, diametrally, than the chamber 11. The poppet has a reduced cylindrical wall 40 that extends from wall 21 across chamber 11. Thus, pressure fluid from inlet 6, entering said chamber 11, is effective on the outer surface of the wall 40. An end wall 22 closes the end of the poppet that is directed toward the bore 8, an annular bevel 23 being formed at the corner where walls 40 and 22 meet, the same constituting a valve face adapted to have sealing engagement with the valve seat 16. With the valve face 23 in sealing or flow-closing engagement with the seat 16, part of said face is subject to the pressure of the inlet 6. Said pressure is effective to move the poppet to open position.

A transverse wall 41 connects walls 21 and 40 and one or more pressure-bleeding apertures 24 are provided in the wall 41 to admit the inlet pressure to the hollow of the poppet. Thus, with the poppet in the position shown, the interior pressure therein biases the poppet in a direction toward the valve seat 16, closing flow from the inlet to the outlet of the valve.

A central aperture 25 is provided in the end wall 22 of the poppet, one or more bleed passages 36 communicating said aperture with the bore 8.

In this instance, the poppet 15 is provided with a tubular extension 42 that spans the body bore 8, extending from wall 22 in a direction opposite to the cylindrical walls 40 and 21.

The stem 17 of the valve intermediate its ends, has a bevel face 26 that cooperates with aperture 25 to close flow from cylinder 9, and the interior of the poppet, into the bore 8. Said stem extends axially through the tubular extension 42 in which it has bearing, an extension 27 thereof passing through a flow-sealing bearing 28.

The stem 27 extends into end engagement with a pusher element 43 that has bearing in the block 13a. It will be evident that an endwise push on said pusher element 43 will longitudinally shift the stem 17 in a direction to unseat the pilot valve 18. Such stem movement may be accomplished manually, if desired, or by means which is shown in the form of solenoid 20 of the push type, the core 34a having a pin extension 44 that has endwise engagement with pusher element 43 to effect opening of valve 18 when the means 20 is energized.

An alternative way of opening the valve 18 includes passage 45 that interconnects chamber 11 and the bore 46 in which the pusher element 43 is disposed. This passage 45 may be provided in addition to the means to convert the valve into one that has automatic pressure relief. Under normal pressures, the pressure in passage 45 and on pusher element 43 will not cause shifting of the rod 17. However, if the pressure becomes unduly excessive, the valve will open and exhaust such excess pressure into port 7.

The means 19 acts on the end of the stem 17 that is opposite to the portion 27. This end or portion 31 protrudes through the plate 13 through a sealing bearing 32, into a bore 47 of a block 48 that is provided as an extension of the valve body. A pressure-adjusting screw 49 is carried by the block 48 for varying the bias of a spring 50 that, through the medium of a ball or other member 51, places pressure resistance to shift on the end 31 of the stem 17. It will be noted that spring 50 is capable of tension-adjustment by means of screw 49.

The valve shown not only provides adjustability and various modes of actuation, as explained, but enables the provision of additional features. One of these is the provision of a check valve that prevents back flow from outlet 7 to inlet 6. The check is shown as a valve element 52 that is piloted on the tubular extension 42 of the poppet and is biased by a spring 53 to seal against a seat 54 where the passage 8 joins the outlet 6. Another is the provision of a bleed passage 55 in the body 5 that provides for flow to and from the cylinder 9 (into which said passage opens) for remote control of another valve or other device.

Such other details of construction and arrangement that are common to both valves here disclosed and not specifically described in connection with the modification are to be assumed as parts of said modification.

It will be clear that the force necessary to operate the valve, regardless how great the pressure in inlet 6, is only that which overcomes the spring 19.

While the foregoing has illustrated and described what I now contemplate to be the best mode of carrying out my invention, the construction is, of course, subject to modification without departing from the spirit and scope of my invention. Therefore, I do not desire to restrict the invention to the particular form of construction illustrated and described, but to cover all modifications that may fall within the scope of the appended claims.

Having thus described my invention, what I claim and desire to secure by Letters Patent is:

1. In a valve having an inlet and an outlet and a passage connecting the inlet and outlet, a cylinder extending from said connecting passage on the inlet side thereof, a valve seat located where said passage and inlet join, a second valve seat located where said passage and outlet join, a hollow poppet having a cylindrical portion in said cylinder and provided with an annular face that is directed toward the former valve seat and is provided with a bleed aperture directly open to the inlet to pass inlet flow into said cylinder through the hollow of the poppet, a restricted outlet from the cylinder to direct flow that enters the hollow of the poppet and said cylinder to the outside of the valve , said poppet being provided with a tubular extension extending through and beyond the mentioned connecting passage and having an axial through passage therein having an end open to the hollow of the poppet, passages in the poppet connecting said axial passage and the passage that connects the inlet and outlet, a stem extending through said axial passage, a valve face on the stem residing in the hollow of the poppet and directed toward operative controlling engagement with said end of the axial passage, means engaged with one end of the stem to resiliently bias the stem in a direction to seat said valve face on the stem against said end of the axial passage to close flow between the hollow of the poppet and the passage that connects the inlet and outlet, means to move said stem against its spring bias including passage means open to inlet pressure to direct the force of said pressure against the stem in a direction to move the stem longitudinally against the resilient bias thereon when the inlet pressure is greater than normal, said bleed aperture in the poppet constituting means to subject the hollow of the poppet to inlet pressure, the pressure within the poppet being released through the axial passage into the connecting passage upon opening of the axial passage, and a check valve carried by the tubular extension of the poppet and biased toward the valve seat where the connecting passage and the outlet join, said check valve checking flow from the outlet toward the connecting passage and opening against its bias to allow discharge from the connecting passage into the outlet.

2. In a valve according to claim 1 in which the means to move the stem against its spring bias comprises a member in endwise engagement with said other end of the stem, the passage means that is open to inlet pressure being directed to act on the mentioned member to push the same in an endwise direction to move the stem against its resilient bias.

3. In a valve according to claim 2, the pressure in said pressure-conducting passage means being normally ineffective to actuate the stem to open the valve controlled by the stem, and means to regulate the resistance of the resilient bias on the stem to regulate the degree of inlet pressure that will actuate the stem-controlled valve.

References Cited in the file of this patent

UNITED STATES PATENTS

| 1,452,859 | Wichser | Apr. 24, 1923 |
| 2,020,833 | Hansen | Nov. 12, 1935 |
| 2,758,768 | Payne | Aug. 14, 1956 |

FOREIGN PATENTS

| 122,581 | Great Britain | 1919 |
| 251,392 | Great Britain | 1926 |
| 910,858 | Germany | 1954 |